United States Patent
Banerjee et al.

(10) Patent No.: US 10,338,822 B2
(45) Date of Patent: Jul. 2, 2019

(54) SYSTEMS AND METHODS FOR NON-UNIFORM MEMORY ACCESS ALIGNED I/O FOR VIRTUAL MACHINES

(71) Applicant: VMware, Inc., Palo Alto, CA (US)

(72) Inventors: Amitabha Banerjee, Belmont, CA (US); Rishi Mehta, San Jose, CA (US); Xiaochuan Shen, Fremont, CA (US); Seongbeom Kim, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 108 days.

(21) Appl. No.: 15/183,386

(22) Filed: Jun. 15, 2016

(65) Prior Publication Data

US 2017/0364279 A1  Dec. 21, 2017

(51) Int. Cl.
| | |
|---|---|
| *G06F 9/455* | (2018.01) |
| *G06F 9/50* | (2006.01) |
| *G06F 3/06* | (2006.01) |
| *G06F 9/48* | (2006.01) |

(52) U.S. Cl.
CPC ............ *G06F 3/0611* (2013.01); *G06F 3/067* (2013.01); *G06F 3/0659* (2013.01); *G06F 3/0664* (2013.01); *G06F 9/45558* (2013.01); *G06F 9/4881* (2013.01); *G06F 9/5077* (2013.01); *G06F 2009/45579* (2013.01); *G06F 2009/45583* (2013.01)

(58) Field of Classification Search
CPC . G06F 9/455–4558; G06F 2009/45562–45595
See application file for complete search history.

(56) References Cited

U.S. PATENT DOCUMENTS

| | | | |
|---|---|---|---|
| 2009/0044276 A1* | 2/2009 | Abdel-Aziz | ........ H04L 63/1425 726/24 |
| 2011/0296406 A1 | 12/2011 | Bhandari et al. | |
| 2015/0052287 A1* | 2/2015 | Venkatasubramanian | ................... G06F 9/5033 711/6 |

(Continued)

OTHER PUBLICATIONS

Ali, Zherig, Mann, Srinivasan: "Power Aware NUMA Scheduler in Vmware's ESXi Hypervisor", 2015 IEEE International Symposium on Workload Characterization, Oct. 4, 2015, pp. 193-202, XP032804837, retrieved on Oct. 30, 2015.

(Continued)

*Primary Examiner* — Nicholas J Simonetti
(74) *Attorney, Agent, or Firm* — Patterson + Sheridan, LLP

(57) ABSTRACT

Systems and methods described herein align various types of hypervisor threads with a non-uniform memory access (NUMA) client of a virtual machine (VM) that is driving I/O transactions from an application so that no remote memory access is required and the I/O transactions can be completed with local accesses to CPUs, caches, and the I/O devices of a same NUMA node of a hardware NUMA system. First, hypervisor of the VM detects whether the VM runs on a single or multiple NUMA nodes. If the VM runs on multiple NUMA nodes, a NUMA client on which the application is executing the I/O transactions is identified and knowledge of resource sharing between the NUMA client and its related hypervisor threads is established. Such knowledge is then utilized to schedule the NUMA client and its related hypervisor threads to the same NUMA node of the NUMA system.

20 Claims, 2 Drawing Sheets

(56) References Cited

U.S. PATENT DOCUMENTS

2016/0070598 A1     3/2016  Vadkerti et al.
2016/0077848 A1*    3/2016  Tu ...................... G06F 9/45558
                                                                        718/1
2016/0092258 A1     3/2016  Mehta et al.
2017/0337073 A1*   11/2017  Tsirkin ................ G06F 9/45558

OTHER PUBLICATIONS

International Search Report issued in PCT/US2017/037547 dated Sep. 29, 2017.

* cited by examiner

SYSTEMS AND METHODS FOR NON-UNIFORM MEMORY ACCESS ALIGNED I/O FOR VIRTUAL MACHINES

BACKGROUND

A Non-Uniform Memory Access (NUMA) hardware system/host contains multiple NUMA nodes interconnected by a high-speed link such as Intel QuickPath Interconnect (QPI). Each NUMA node comprises a group of CPUs/cores that have the same memory access latency to local memory and typically longer latencies when accessing memory local to other NUMA nodes via the interconnect. NUMA hardware systems have been deployed in increasing numbers in recent years since it is much easier to scale the number of CPUs in each of such systems than conventional hardware systems.

A virtual machine known as "wide VM" may comprise a large number of virtual CPUs running on a NUMA system. If the number of virtual CPUs exceeds the number of CPUs in each NUMA node of the system, the virtual CPUs of the wide VM can be grouped into a plurality of NUMA clients for the wide VM, wherein the virtual CPUs in each NUMA client can be scheduled to run on the same physical NUMA node of the NUMA system. A guest operating system (OS) of the wide VM sees topology of the NUMA clients in the same way that a native OS would see the NUMA hardware topology of a physical NUMA system. Under such configuration, the virtual CPUs in each NUMA client have similar latency of memory access, and the guest OS can optimize memory allocation based on the NUMA client topology the same way the native OS would optimize memory allocation based on the NUMA hardware information.

An application running on the wide VM can be NUMA aware, meaning that it runs on one of the NUMA clients of the VM. (In the case of a non-wide VM, the application must run on the only NUMA client of the VM.) The NUMA client of the application is scheduled to run on one of the NUMA nodes of the NUMA system. Since the application may conduct extensive I/O operations such as network I/O transactions, it is desirable to have the NUMA client of the VM, hypervisor threads, IO processing threads of a virtual I/O device (virtual interrupts of a virtual Network Interface Card or virtual NIC as a non-limiting example), and the I/O device used by the VM aligned on the same NUMA node in order to achieve the best I/O performance for the VM.

SUMMARY

Systems and methods described herein align various types of hypervisor threads with a non-uniform memory access (NUMA) client of a virtual machine (VM) that is driving I/O transactions from an application so that no remote memory access is required and the I/O transactions can be completed with local accesses to CPUs, caches, and the I/O devices of a same NUMA node of a hardware NUMA system. First, hypervisor of the VM detects whether the VM runs on a single or multiple NUMA nodes. If the VM runs on multiple NUMA nodes, a NUMA client on which the application is executing the I/O transactions is identified and knowledge of resource sharing between the NUMA client and its related hypervisor threads is established. Such knowledge is then utilized to schedule the NUMA client and its related hypervisor threads to the same NUMA node of the NUMA system.

DETAILED DESCRIPTION

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
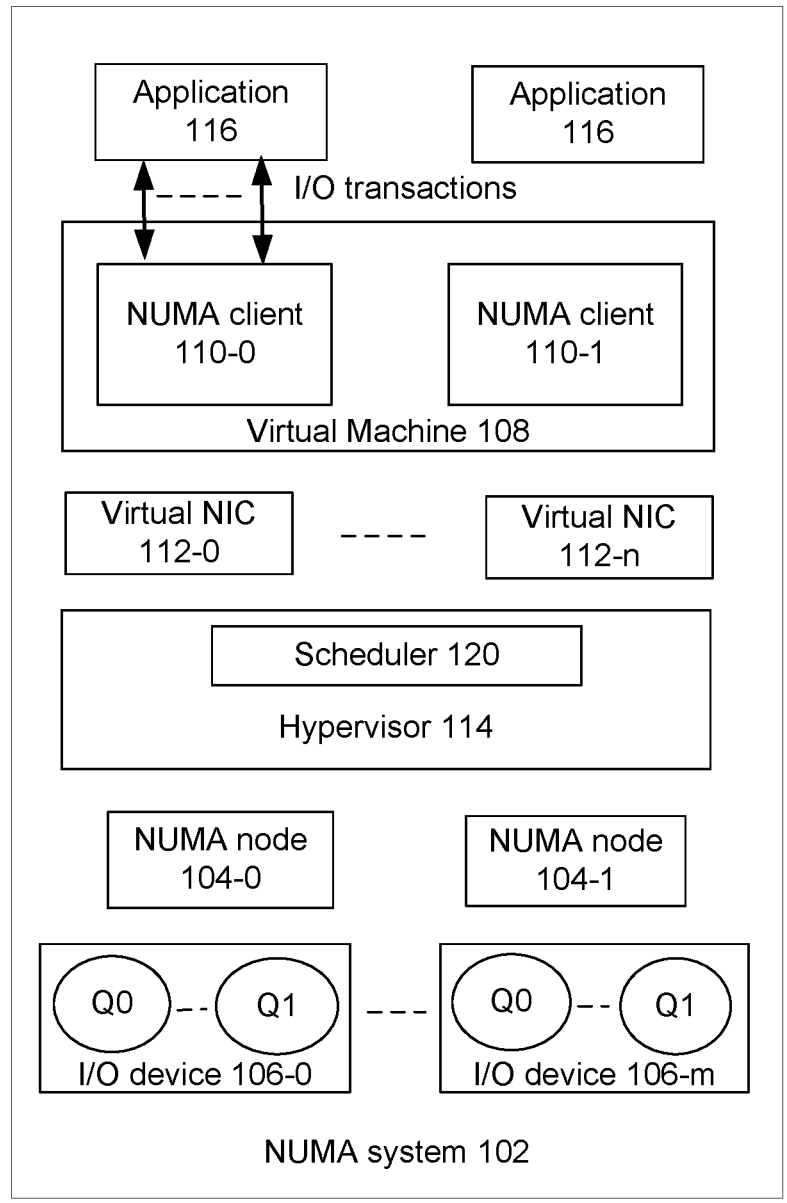
FIG. 1 shows an example of a diagram of a system to support NUMA aligned I/O for VM in accordance with some embodiments.

FIG. 1 shows an example of a system diagram to support NUMA aligned I/O for VM. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least an Non-Uniform Memory Access (NUMA) hardware system 102 having a plurality of NUMA nodes 104 wherein each NUMA node 104 comprises a group of local memories and CPUs/cores (not shown) having the same local-memory access latency, wherein different NUMA nodes 104 may correspond to different groups of CPUs having varying latencies of memory access across the NUMA nodes. The NUMA system 102 may also include a plurality of I/O devices 106 shared among the NUMA nodes 104, wherein the I/O devices 106 are physical input/output interfaces such as Network Interface Cards (NICs) that connect to external networks, storage adapter(s) that connect to external storage devices, graphic card(s) that connect to display or similar devices, and/or various other adapters connected memory devices such as flash, optical, or magnetic media in or associated with the hardware system 102. Each of the I/O devices 106 has one or more device queues (e.g., Q0, Q1) as discussed in details below.

In the example of FIG. 1, one or more virtual machines (VMs) 108 (only one shown) run on top of hypervisor 114 of the NUMA system 102, wherein each VM 108 is configured to support operations and I/O transactions of one or more applications 116. In some embodiments, VM 108 is a wide VM having a plurality of virtual CPUs (not shown). If the number of virtual CPUs in the wide VM 108 exceeds the number of CPUs in each of the NUMA nodes 104, the virtual CPUs of the wide VM 108 can be grouped into a plurality of NUMA clients 110, wherein the virtual CPUs in each NUMA client 110 is no more than the number of CPUs in each NUMA node 104 so that each NUMA client 110 of the wide VM 108 can be assigned to and scheduled to run on the same NUMA node 104 of the NUMA system 102.

In the example of FIG. 1, each NUMA client 110 of the VM 108 is configured to serve one or more applications 116 running on the VM 108 including their I/O transactions. Although other types of virtual I/O devices may be implemented, for the purpose of this example, each VM 108 is configured to communicate with the hypervisor 114 via one virtual NIC (or "VNIC") 112, wherein each virtual NIC 112 is a virtual I/O device configured to assign a plurality of I/O transactions from the application 116 to one of the I/O devices 106 connected to an external physical network (not shown). In case of a wide VM 108, each virtual NIC 112 can be shared among multiple NUMA clients 110. Specifically, each virtual NIC 112 may be configured to forward network packets from the I/O transactions to a port (not shown) of the I/O device 106. Each port of the I/O device 106 is an interface associated one or more device queues, e.g., Q0, Q1. Here, certain port(s) of the I/O device 106 are "uplink" ports for sending data out over the physical network, while other port(s) send data via the virtual NICs 112 to a NUMA client 110 of the VM 108, which further communicates with the application 116 running on the NUMA client 110.

In the example of FIG. 1, the hypervisor 114 running on the NUMA system 102 is configured to generate at least one or more of the following types of hypervisor threads in the context of network I/Os with other components of the system 100:

VM transmitting threads, which are responsible for transmitting packets of the I/O transactions between the application(s) 116 and I/O device 106. Here, each VM transmitting thread can be allocated per NUMA client, per VM, per I/O device, or per device queue of each I/O device.

Network polling thread, which is responsible for polling packets from the I/O device 106 and supplying them to the VM 108. The network polling thread is also responsible for detecting transaction completions for the packets transmitted by the VM 108. The network polling thread is per device queue of the I/O device 106.

Network scheduling thread(s), which are configured to arbitrate among the different VM transmitting threads, all of which may be trying to transmit packets to the same device queue of the I/O device 106.

Figure 2:
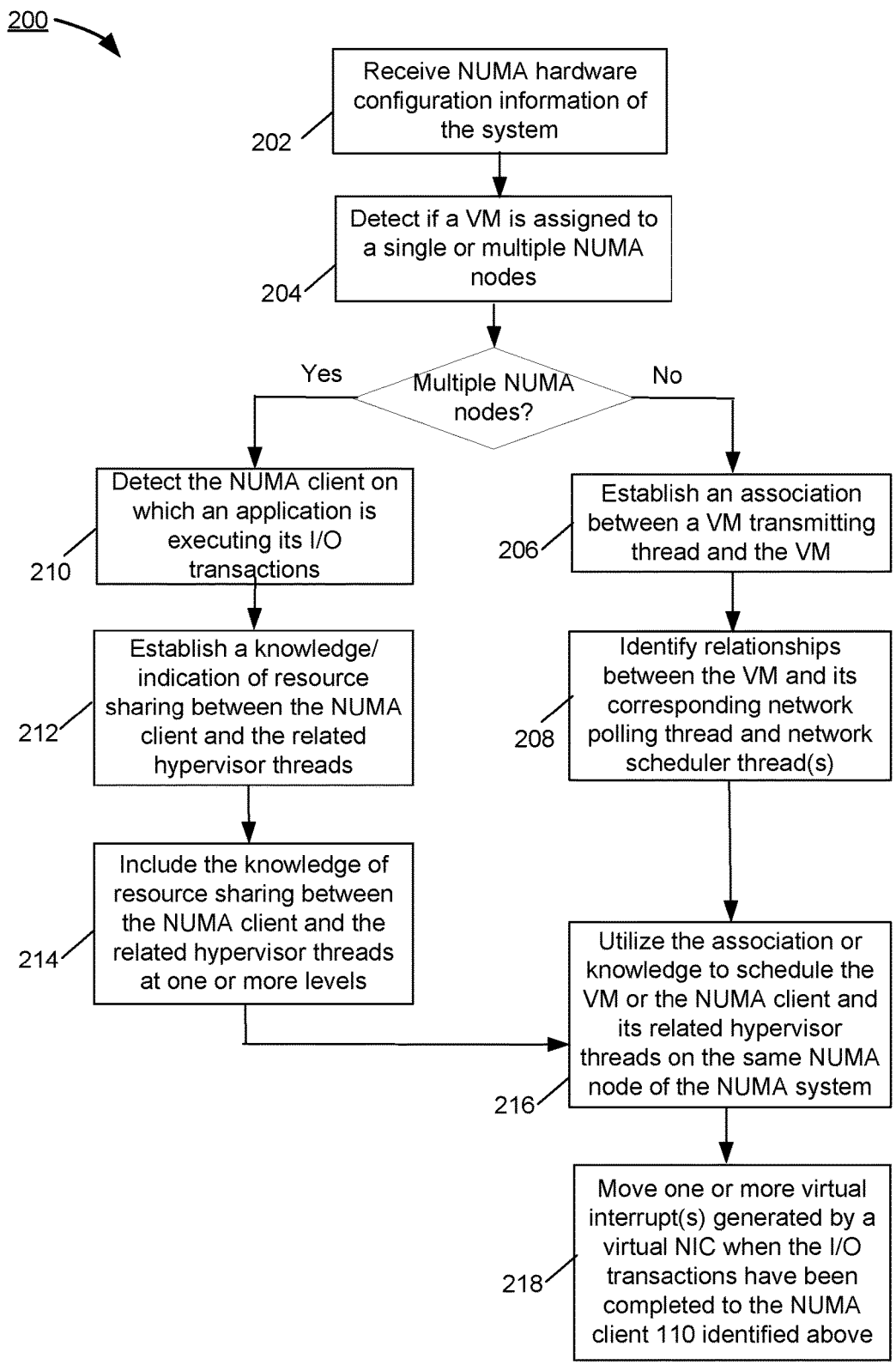
FIG. 2 is a diagram of an exemplary method to support NUMA aligned I/O for VM in accordance with some embodiments.

FIG. 2 is a diagram 200 of an exemplary method to support NUMA aligned I/O for VM. This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

When the NUMA system 102 is first started/powered on, the NUMA hardware topology/configuration of the NUMA system 102 is detected and a plurality of NUMA nodes 104 each having a group of physical CPUs/cores with the same memory access latency are identified. In operation 202, the hypervisor 114 running on the NUMA system 102 receives the NUMA hardware configuration information from the BIOS or other firmware or hardware components, wherein such information is utilized by the hypervisor 114 to optimize memory allocation for the I/O transactions of the VMs running on the NUMA system 102 as discussed below. In operation 204, the hypervisor 114 determines whether a VM 104 running on it is scheduled/assigned to either a single NUMA node 104 (meaning that it has no more virtual CPUs than the physical CPUs/cores in one NUMA node) or to a plurality of NUMA nodes 104 (meaning that it has more virtual CPUs than the CPU cores in a single NUMA node).

In the case where the VM 108 is assigned to a single NUMA node 104, the VM 108 has a single NUMA client 110 corresponding to the single NUMA node 104 and the hypervisor 114 is configured to establish an association between a VM transmitting thread and the VM 108 in operation 206, wherein such association is provided to a scheduler 120 of the hypervisor 114 as an indication to always schedule the VM 108 and the corresponding VM transmitting thread on the same physical NUMA node 104. In operation 208, the hypervisor 114 is further configured to identify relationships between the VM 108 and its corresponding hypervisor threads (such as network polling thread and network scheduler thread(s)) via, for a non-limiting example, information or signal about the hypervisor threads exchanged between the hypervisor 114 and the guest OS of the VM 108.

In the case where the VM 108 is assigned to multiple NUMA nodes 104, the VM 104 is a wide VM and is organized into a plurality of NUMA clients 110, each of which should be assigned its own corresponding NUMA node 104. Under such scenario, the hypervisor 114 is configured to detect the NUMA client 110 on which an application 116 is executing its I/O transactions in operation 210. In the context of networking devices, the hypervisor 114 can detect such NUMA client 110 by inspecting the network transmit descriptor and/or receive descriptor (not shown) of a virtual NIC 112 serving the NUMA client 110. Here a descriptor is a data structure used to maintain the address of I/O buffers along with other fields that the virtual NIC 112 utilizes to program an I/O device 106 to transmit packets of the I/O transactions. Specifically, the transmit descriptor contains the address of the packets that need to be transmitted and the receive descriptor contains the address that has been registered to handle the received packets. The NUMA client 110 that the address belongs to can be inferred from the address of either of the descriptors by the hypervisor 114. In the context of storage devices, the NUMA client 110 can be identified by the hypervisor 114 by inspecting the I/O request descriptor address passed down by the guest OS of the VM 108 to the hypervisor 114.

In some embodiments, the descriptors may include each packet in its entirety or data/payload portion and header of the packet separately. The hypervisor 114 is configured to identify such case by looking at one or more of (i) the size of the header and payload of the packet; (ii) certain bits set in the descriptor such as start of packet (sop) and/or end of packet (eop) bits. For a non-limiting example, if the content size of a descriptor matches the expected network packet header (TCP+IP+MAC address) size, the hypervisor 114 may infer that this descriptor contains a packet header. On the other hand, if the content size is much larger than the expected network packet header, then the descriptor is unlikely to be a header and may include the payload of the packet as well, which the hypervisor 114 is configured to analyze for transmission of the packet.

In some embodiments, the identification of NUMA client 110 described above can be made per descriptor programmed by the guest OS of the VM 108 by grouping information for other entities (e.g., device queues). For a non-limiting example, all descriptors belong to a device queue (Q0 or Q1) and all device queues belong to an I/O device 106, wherein each of the device queues maintains packets from the I/O transactions for the application 116 interacting with a NUMA client 110. In some embodiments, there is always one queue for each application 116. As such, if all descriptors of a device queue (e.g., Q0) are assigned to the same NUMA client 110-0, the hypervisor 114 is configured to map the device queue Q0 to the NUMA client 110-0. Note that the mapping between a device queue and a NUMA client 110 may change at run time, meaning that the device queue Q0 may be mapped to a first NUMA client 110-0 at a particular time, but then mapped to a second NUMA client 110-1 at a later time. This may happen because either: (i) a different application 116 is assigned to the device queue, or (ii) the current application 116 has moved to a different NUMA client 110-1.

Once the NUMA client 110 on which the application 116 is executing its I/O transactions is identified, the hypervisor 114 is configured to establish a knowledge/indication of resource sharing between the NUMA client 110 and the related hypervisor threads such as the VM transmitting threads, the network polling thread, and the network scheduling thread(s) in operation 212. This can be accomplished by setting communication tracking rates when the packets from the I/O transactions of the application 116 are transmitted and received (for networking device context) or when an I/O transaction is done (for storage device context). Here, the communication tracking rate is an indication provided to the scheduler 120 that a communication link exists between the NUMA client 110 of the VM 108 and its I/O-related hypervisor threads and they should be scheduled together on the same NUMA node 104.

In some embodiments, the hypervisor 114 is configured to include the knowledge of resource sharing between the NUMA client 110 and the related hypervisor threads at one or more of the following levels in operation 214: (i) in each transmitted/received packet or each I/O transaction from the application 116 interacting with the NUMA client 110; (ii) in each device queue maintaining packets from the I/O transactions for the application 116; and/or (iii) in each of the I/O devices 106 destined for the I/O transactions for the application 116. In operation 216, the scheduler 120 of the hypervisor 114 is configured to utilize the above knowledge to schedule the NUMA client 110 and its related hypervisor threads to the same NUMA node 104 of the NUMA system 102. Finally, the hypervisor 114 is configured to schedule one or more I/O processing threads of a virtual device (e.g., the virtual NIC 112) serving the NUMA client 110 to align with the hypervisor threads on the NUMA node 104 in the NUMA system 102. This can be done, for a non-limiting example, by moving one or more virtual interrupts generated by the virtual NIC 112 when the I/O transactions have been completed (e.g., packets having been transmitted or received) from the queue maintaining the packets from the I/O transactions for the application 116 to the NUMA client 110 identified above in operation 218. As such, all of the I/O transactions, the NUMA client 110 of the VM 108, the virtual interrupts from the hypervisor threads are aligned on the same NUMA node 104 of the NUMA system 102 to achieve the best I/O performance for the VM 108.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An system to support non-uniform memory access (NUMA) aligned I/O, comprising:
a NUMA hardware system having a hypervisor running on it and configured to:
determine whether a virtual machine (VM) is assigned to a single or multiple NUMA nodes of the NUMA hardware system, wherein each of the NUMA nodes comprises a group of local memories and CPUs having the same memory access latency;
identify a NUMA client of the VM on which an application is executing I/O transactions if the VM runs on multiple NUMA nodes, wherein the VM is grouped into a plurality of NUMA clients each having no more virtual CPUs than the CPUs in each of the NUMA nodes;
determine resource sharing between the NUMA client and its related hypervisor threads;
utilize the determination of resource sharing to schedule the NUMA client and its related hypervisor threads to a same NUMA node of the NUMA hardware system;
move one or more I/O processing threads of a virtual I/O device, including one or more virtual interrupts generated by the virtual I/O device, to the NUMA client so that all of the I/O transactions, the NUMA client of the VM, the I/O processing threads of a virtual Network Interface Card (NIC), and the related hypervisor threads of the NUMA client are aligned on the same NUMA node of the NUMA hardware system.

2. The system of claim 1, wherein:
the hypervisor is configured to optimize memory allocation for the I/O transactions of the VM running on the NUMA hardware system by utilizing NUMA hardware configuration information from a native OS of the NUMA hardware system.

3. The system of claim 1, wherein:
the hypervisor threads include one or more of:
VM transmitting threads configured to transmit packets of the I/O transactions between the application and a physical network interface card;
a network polling thread configured to poll packets from an I/O device of the NUMA hardware system and supply them to the VM;
a network scheduling thread configured to arbitrate among the different VM transmitting threads, all of which try to transmit the packets to a same device queue of the I/O device.

4. The system of claim 3, wherein:
the hypervisor is configured to establish an association between one of the VM transmitting threads and the VM if the VM is assigned to a single NUMA node, wherein such association is provided to the hypervisor as an indication to schedule the VM and the corresponding VM transmitting thread on the same physical NUMA node.

5. The system of claim 4, wherein:
the hypervisor is configured to identify relationships between the VM and its corresponding network polling thread and network scheduler thread via a signaling mechanism between the hypervisor and a guest OS of the VM.

6. The system of claim 1, wherein:
the hypervisor is configured to identify the NUMA client by inspecting at least one of a network transmit descriptor and a receive descriptor of the virtual NIC, wherein the descriptor is configured to maintain at least one of a header and a payload of one or more packets of the I/O transactions.

7. The system of claim 1, wherein:
the hypervisor is configured to set a communication tracking rate when one or more packets from the I/O transactions are transmitted and received or when the I/O transactions are done, wherein the communication tracking rate is an indication provided to the hypervisor that a communication link exists between the NUMA client of the VM and its related hypervisor threads.

8. A method to support non-uniform memory access (NUMA) aligned I/O, comprising:
determining whether a virtual machine (VM) is assigned to a single or multiple NUMA nodes of the NUMA hardware system, wherein each of the NUMA nodes comprises a group of local memories and CPUs having the same memory access latency;
identifying a NUMA client of the VM on which an application is executing I/O transactions if the VM runs on multiple NUMA nodes, wherein the VM is grouped into a plurality of NUMA clients each having no more virtual CPUs than the CPUs in each of the NUMA nodes;
determining resource sharing between the NUMA client and its related hypervisor threads;
utilizing the determination of resource sharing to schedule the NUMA client and its related hypervisor threads to a same NUMA node of the NUMA hardware system;
moving one or more I/O processing threads of a virtual I/O device, including one or more virtual interrupts generated by the virtual I/O device, to the NUMA client so that all of the I/O transactions, the NUMA client of the VM, the I/O processing threads of a virtual Network Interface Card (NIC), and the related hypervisor threads of the NUMA client are aligned on the same NUMA node of the NUMA hardware system.

9. The method of claim 8, further comprising:
optimizing memory allocation for the I/O transactions of the VM running on the NUMA hardware system by utilizing NUMA hardware configuration information from a native OS of the NUMA hardware system.

10. The method of claim 8, wherein:
the hypervisor threads include one or more of:
VM transmitting threads configured to transmit packets of the I/O transactions between the application and a physical network interface card;
a network polling thread configured to poll packets from an I/O device of the NUMA hardware system and supply them to the VM;
a network scheduling thread configured to arbitrate among the different VM transmitting threads, all of which try to transmit the packets to a same device queue of the I/O device.

11. The method of claim 10, further comprising:
establishing an association between one of the VM transmitting threads and the VM if the VM is assigned to a single NUMA node, wherein such association is provided to the hypervisor as an indication to schedule the VM and the corresponding VM transmitting thread on the same physical NUMA node.

12. The method of claim 11, further comprising:
identifying relationships between the VM and its corresponding network polling thread and network scheduler thread via a signaling mechanism between the hypervisor and a guest OS of the VM.

13. The method of claim 8, further comprising:
identifying the NUMA client by inspecting at least one of a network transmit descriptor and a receive descriptor of the virtual NIC, wherein the descriptor is configured to maintain at least one of a header and a payload of one or more packets of the I/O transactions.

14. The method of claim 8, further comprising:
setting a communication tracking rate when one or more packets from the I/O transactions are transmitted and received or when the I/O transactions are done, wherein the communication tracking rate is an indication provided to the hypervisor that a communication link exists between the NUMA client of the VM and its related hypervisor threads.

15. At least one non-transitory computer-readable storage medium having computer-executable instructions embodied thereon, wherein, when executed by at least one processor, the computer- executable instructions cause the at least one processor to:
 determine whether a virtual machine (VM) is assigned to a single or multiple non-uniform memory access (NUMA) nodes of the NUMA hardware system, wherein each of the NUMA nodes comprises a group of local memories and CPUs having the same memory access latency;
 identify a NUMA client of the VM on which an application is executing I/O transactions if the VM runs on multiple NUMA nodes, wherein the VM is grouped into a plurality of NUMA clients each having no more virtual CPUs than the CPUs in each of the NUMA nodes;
 determine resource sharing between the NUMA client and its related hypervisor threads;
 utilize the determination of resource sharing to schedule the NUMA client and its related hypervisor threads to a same NUMA node of the NUMA hardware system;
 move one or more I/O processing threads of a virtual I/O device, including one or more virtual interrupts generated by the virtual I/O device, to the NUMA client so that all of the I/O transactions, the NUMA client of the VM, the I/O processing threads of a virtual Network Interface Card (NIC), and the related hypervisor threads of the NUMA client are aligned on the same NUMA node of the NUMA hardware system.

16. The at least one non-transitory computer-readable storage medium of claim 15, wherein the computer-executable instructions further cause the at least one processor to:
 optimize memory allocation for the I/O transactions of the VM running on the NUMA hardware system by utilizing NUMA hardware configuration information from a native OS of the NUMA hardware system.

17. The at least one non-transitory computer-readable storage medium of claim 16, wherein the computer-executable instructions further cause the at least one processor to:
 identify relationships between the VM and its corresponding network polling thread and network scheduler thread via a signaling mechanism between the hypervisor and a guest OS of the VM.

18. The at least one non-transitory computer-readable storage medium of claim 15, wherein the computer-executable instructions further cause the at least one processor to:
 establish an association between a VM transmitting thread of the hypervisor threads and the VM if the VM is assigned to a single NUMA node, wherein such association is provided to the hypervisor as an indication to schedule the VM and the corresponding VM transmitting thread on the same physical NUMA node.

19. The at least one non-transitory computer-readable storage medium of claim 15, wherein the computer-executable instructions further cause the at least one processor to:
 identify the NUMA client by inspecting at least one of a network transmit descriptor and a receive descriptor of the virtual NIC, wherein the descriptor is configured to maintain at least one of a header and a payload of one or more packets of the I/O transactions.

20. The at least one non-transitory computer-readable storage medium if claim 15, wherein the computer-executable instructions clause the at least one processor to:
 set a communication tracking rate when one or more packets from the I/O transactions are transmitted and received or when the I/O transactions are done, wherein the communication tracking rate is an indication provided to the hypervisor that a communication link exists between the NUMA client of the VM and its related hypervisor threads.

\* \* \* \* \*